United States Patent [19]

Binsack et al.

[11] 4,152,367
[45] May 1, 1979

[54] BRANCHED POLYARYL-SULPHONE/POLYCARBONATE MIXTURES AND THEIR USE FOR THE PRODUCTION OF EXTRUDED FILMS

[75] Inventors: Rudolf Binsack, Krefeld; Eckart Reese, Dormagen; Joachim Wank, Dormagen, all of Fed. Rep. of Germany

[73] Assignee: Bayer Aktiengesellschaft, Leverkusen, Fed. Rep. of Germany

[21] Appl. No.: 927,808

[22] Filed: Jul. 25, 1978

[30] Foreign Application Priority Data

Aug. 4, 1977 [DE] Fed. Rep. of Germany ....... 2735092
Dec. 9, 1977 [DE] Fed. Rep. of Germany ....... 2755026

[51] Int. Cl.$^2$ .................. C08L 69/00; C08L 81/06
[52] U.S. Cl. .................................................. 260/860
[58] Field of Search .................. 260/860; 528/174

[56] References Cited

U.S. PATENT DOCUMENTS

| | | | |
|---|---|---|---|
| 3,365,517 | 1/1968 | Barth | 260/860 |
| 3,631,222 | 12/1971 | Vogel et al. | 260/857 R |
| 3,647,751 | 3/1972 | Darsow et al. | 528/174 |
| 3,652,715 | 3/1972 | Holub et al. | 260/860 |
| 3,689,464 | 9/1972 | Holub et al. | 260/860 X |
| 3,792,115 | 2/1974 | Kishikawa et al. | 260/860 |
| 3,960,815 | 6/1976 | Darsow et al. | 528/174 |

*Primary Examiner*—Thomas DeBenedictis
*Attorney, Agent, or Firm*—Gene Harsh; Lawrence S. Pope

[57] ABSTRACT

The present invention is concerned with mixtures of branched polyaryl-sulphone and aromatic polycarbonates having Mw in excess of about 60,000. These mixtures are particularly suitable for the production of extruded film although the polycarbonate itself is of too high a molecular weight to be conveniently extruded by itself. These films display superior stress-cracking properties and resistance to unsaturated polyester resins compared to similar blends with lower molecular weight polycarbonates.

7 Claims, No Drawings

BRANCHED POLYARYL-SULPHONE/POLYCARBONATE MIXTURES AND THEIR USE FOR THE PRODUCTION OF EXTRUDED FILMS

FIELD OF THE INVENTION

The present invention relates to polyaryl-sulphone/polycarbonate mixtures consisting of about 95% by weight to 30% by weight of a branched polyaryl-sulphone and about 5% by weight to 70% by weight of a polycarbonate with a $\overline{M}w$ (weight-average molecular weight) greater than about 60,000.

The proportions in the mixture are preferably between about 90% by weight and 60% by weight of polyaryl-sulphone and between about 10% by weight and 40% by weight of polycarbonate.

In particular, the proportions in the mixture are between about 85% by weight and 70% by weight of polyaryl-sulphone and between about 15% by weight and 30% by weight of polycarbonate.

BACKGROUND OF THE INVENTION

Mixtures of linear polyaryl-ether-sulphones and polycarbonates have already been described (see DT-OS (German Published Specification) No. 1,719,244 and U.S. Pat. No. 3,365,517); their use for the production of films has also already been described (Page 21 of DT-OS (German Published Specification) 1,719,244).

These mixtures are said to overcome, on the one hand, the undesired embrittlement of the polyaryl-ether-sulphones under load and, on the other hand, the susceptibility of the polycarbonates to stress-cracking in the presence of solvents (Page 2 of the DT-OS (German Published Specification)).

Mixtures of this type can be used for the production of cast films (Examples 8 and 9 of the DT-OS (German Published Specification) and 14 and 16 of the U.S. Patent Specification). The polycarbonates which are customarily suitable for injection-molding and extrusion, the $\overline{M}w$ of which is, for example, about 35,000, are given as polycarbonates in the literature references mentioned (Example 2 of the DT-OS (German Published Specification)). However, films of mixtures of this type have a strong tendency to stress-cracking.

If the polycarbonate component with a $\overline{M}w$ of 35,000 described in DT-OS (German Published Specification) 1,719,244 and U.S. Pat. No. 3,365,517 is replaced by a high-molecular polycarbonate which cannot be extruded without a decrease in the molecular weight, and cast films are produced from mixtures of this type, these products also exhibit a strong tendency to stress-cracking as well as inadequate mechanical properties.

SUMMARY OF THE INVENTION

In view of this, it was surprising that the polyaryl-sulphone/polycarbonate mixtures according to the invention give extruded films with an excellent pattern of properties, although they contain, as the polycarbonate component, a polycarbonate which cannot be extruded without a decrease in the molecular weight.

Branched polyaryl-sulphones which are suitable according to the invention are, in particular, the branched polyaryl-ether-sulphones according to U.S. Pat. No. 3,960,815, incorporated herein by reference, and DT-OS (German Published Specification) 2,305,413 (LeA 14,799), the $\overline{M}w$ (weight-average molecular weight, measured, for example, by means of light scattering) of which are between about 15,000 and about 55,000, preferably between about 20,000 and 40,000. According to this DT-OS (German Published Specification) 2,305,413, these polyaryl-ether-sulphones are prepared by reacting approximately equimolar amounts of at least one aromatic di-alkali metal bis-hydroxylate and at least one bis-(4-halogenoaryl) compound, the aryl nuclei of which are linked by at least one sulphonyl group, with one another, from about 0.1 mol % to about 2 mol %, preferably from about 0.05 mol % to about 1.5 mol %, relative to the bis-hydroxylate and to the bis-halogenoaryl compound, of at least one of the initially mentioned branching agents, that is to say of an alkali metal salt of an aromatic compound containing three or more than three hydroxyl groups and/or of a halogenoaryl compound with three or more than three aryl-bonded halogen substituents which can be replaced under the reaction conditions of the polyaryl-ether-sulphone preparation, also being used. A $C_1$–$C_4$-monoalkyl halide and/or a monophenol, for example, can appropriately also be used as the chain stopper in amounts of 0.001 to about 5 mol %, relative to the bis-hydroxylate and the bis-halogenoaryl compound, in the preparation of these branched aromatic polyaryl-ether-sulphones.

The degree of branching of these polyaryl-ether-sulphones depends, of course, on the amount and nature of the branching agent employed, that is to say of the aromatic compound containing three or more than three hydroxyl groups and/or of the halogeno-aromatic compound containing three or more than three halogen substituents which can be replaced under the conditions of the polyaryl-ether-sulphone preparation.

DETAILED DESCRIPTION OF THE INVENTION

Examples of suitable bis-(4-halogenoaryl) compounds the aryl nuclei of which are linked by at least one sulphone group, are monosulphones of formula I wherein $n=0$, such as 4,4'-dichlorodiphenyl-sulphone or 4,4'-difluorodiphenyl-sulphone, and dihalogenodiaryl-disulphone-aryls of the general formula I wherein $n=1$, the formula being

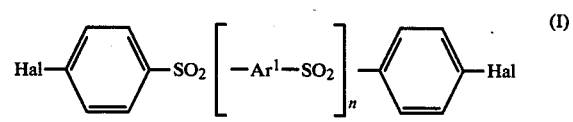

wherein
$n=0$ or $1$
Hal denotes chlorine or fluorine and
$Ar^1$ denotes a biphenylene or oxybisphenylene radical. These compounds are known from the literature.

Suitable bisphenols for the preparation of the aromatic di-alkali metal bis-hydroxylates (di-alkali metal bisphenolates) mentioned are mononuclear bisphenols, such as hydroquinone or resorcinol, but preferably compounds of the general formula II

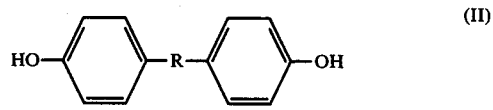

wherein

R denotes a divalent $C_1$-$C_{12}$-alkylene or alkylidene radical, $C_3$-$C_{12}$-cycloalkylene or cycloalkylidene radical, $C_7$-$C_{12}$-aralkylene or aralkylidene radical or $C_8$-$C_{12}$-arylene-bis-alkylidene radical, or the grouping —O—, —S—, —SO—, —SO$_2$— or —CO—, or a single bond.

Examples of these which may be mentioned are: bis-(4-hydroxyphenyl)-methane, 1,1-bis-(4-hydroxyphenyl)-cyclohexane, bis-(4-hydroxyphenyl)-phenylmethane and 4,4'-dihydroxydiphenyl ether, sulphide, sulphoxide or -benzophenone, but in particular 2,2-bis-(4-hydroxyphenyl)-propane, 4,4'-dihydroxydiphenyl-sulphone, 4,4'-dihydroxydiphenyl and α,α'-bis-(4-hydroxyphenyl)-p-diisopropylbenzene. In addition to the hydroxyl groups, the particular aromatic radical can contain additional substituents, such as, for example, alkyl substituents, with the restriction that spatially large substituents in the adjacent position to the hydroxyl groups do not impair their reactivity, through steric hindrance or other hindrance; a suitable bisphenol of this type is 2,2-bis-(3-methyl-4-hydroxyphenyl)-propane.

Examples which may be mentioned of branching components, for the preparation of the polyaryl-ether-sulphones, of the type of the aromatic compound containing three or more than three hydroxyl groups are: phloroglucinol, 4,6-dimethyl-2,4,6-tri-(4-hydroxyphenyl)-hept-2-ene- (=trimeric isopropenylphenol), 4,6-dimethyl-2,4,6-tri-(4-hydroxyphenyl)-heptane (=hydrogenated trimeric isopropenylphenol), 1,3,5-tri-(4-hydroxyphenyl)-benzene, 1,1,1-tri-(4-hydroxyphenyl)-ethane and -propane, tetra-(4-hydroxyphenyl)-methane, 1,4-bis-[(4',4''-dihydroxytriphenyl)-methyl]-benzene (compare Patent application No. P 21 13 347 and U.S. Pat. No. 3,799,953, incorporated herein by reference, and 2,2-bis-[4,4'-bis-(4-hydroxyphenyl)-cyclohexyl]-propane. Those phenols which are trihydric or more than trihydric and can be prepared by reacting p-alkyl-substituted monophenols having unsubstituted o-positions with formaldehyde or compounds which release formaldehyde are particularly suitable, such as, for example, the trisphenol obtained from p-cresol and formaldehyde, and 2,6-bis-(2'-hydroxy-5'-methyl-benzyl)-4-methyl-phenol. Further compounds which may be mentioned are: 2,6-bis-(2'-hydroxy-5'-isopropyl-benzyl)-4-isopropenyl-phenol and bis-[2-hydroxy-3-(2'-hydroxy-5'-methylbenzyl-5-methyl-phenyl]-methane.

Further phenols which are trihydric or more than trihydric which are suitable are those which contain halogen atoms in addition to the phenolic hydroxyl groups, for example the halogen-containing trihydroxyaryl ethers of the formula III

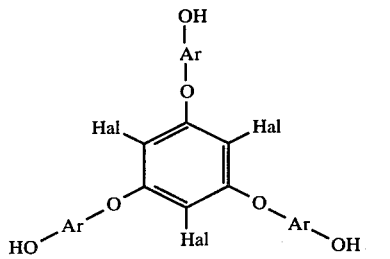

(III)

wherein
Ar denotes a mononuclear or polynuclear, divalent aromatic radical and

Hal denotes chlorine or bromine.

Examples of such compounds are: 1,3,5-tris-(4-hydroxy-(phenoxy)-2,4,6-trichlorobenzene, 1,3,5-tris-[4-(4-hydroxyphenylisopropyl)-phenoxy]-2,4,6-trichlorobenzene, 1,3,5-tris-[4-(4-hydroxy)-biphenoxy]-2,4,6-trichlorobenzene, 1,3,5-tris-[4-(4-hydroxy-phenylsulphonyl)-phenoxy]-2,4,6-trichlorobenzene and 1,3,5-tris-[4-(4-hydroxy-phenyl-isopropyl)-phenoxy]-2,4,6-tribromobenzene, the preparation of which is described in German Offenlegungsschrift (German Published Specification) 1,768,620. Illustrative radicals for the symbol Ar are also given there (Page 3 of DOS (German Published Specification) 1,768,620).

Halogenoaryl compounds which are suitable as branching components for these polyaryl-ether-sulphones and have three or more than three aryl-bonded halogen substituents which can be replaced under the reaction conditions of the polyaryl-ether-sulphone preparation are those in which the halogen substituents are activated by electron-attracting groups; examples which may be mentioned are 1,3,5-tri-(4-chlorophenylsulphonyl)-benzene, 2,4,4'-trichloro-diphenyl-sulphone and 1-chloro-2,6-bis-(4-chlorophenylsulphonyl)-benzene. As well as by the sulphonyl group, the activation of the halogen substituents can also be effected by other electron-attracting groups, that is to say those with a positive sigma value. (Compare Chem. Rev. 49 (1951) page 273 et seq. and Quart. Rev. 12 (1958) 1 et seq.); substituents with sigma values greater than +1 are preferred.

In addition to the sulphone group, for example, the carbonyl or nitro group or the cyano group are suitable as the electron-attracting group for activating the halogen atoms in the halogenoaryl compounds, carrying three or more than three halogen substituents, which are suitable for branching the aromatic polyaryl-ether-sulphones.

Further bis-hydroxy compounds which are suitable for the synthesis of the polyaryl-ether-sulphones are given in German Offenlegungsschriften (German Published Specifications) 1,545,106, 1,932,067, and U.S. Pat. No. 3,647,751, incorporated by reference herein; further bis-(4-halogenoaryl) compounds, the aryl radicals of which are linked by at least one sulphonyl group, are given, for example, in German Offenlegungsschrift (German Published Specification) 1,932,067 and U.S. Pat. No. 3,647,751, incorporated herein by reference.

Alkali metal hydroxylates which are derived from aromatic compounds containing two, three or more than three hydroxyl groups may be mentioned, for example, the corresponding sodium hydroxylates or potassium hydroxylates.

Further details for the preparation of the suitable branched polyaryl-ether-sulphones can be seen in the above-mentioned DT-OS (German Published Specification) 2,305 and U.S. Pat. No. 3,960,815, incorporated herein by reference.

Mixtures of the bis-(4-halogenoaryl)-sulphones mentioned can also be employed for the preparation of the aromatic polyaryl-ether-sulphones. Furthermore, there is also the possibility of reacting mixtures of 2 or more aromatic dialkali metal bis-hydroxylates with the bis-(4-halogenoaryl)-sulphones mentioned, and also of co-using two or more of the above-mentioned branching components for the synthesis of the aromatic polyaryl-ether-sulphones according to the invention.

The branched aromatic polyaryl-ether-sulphones thus have divalent structural elements of the formula IV

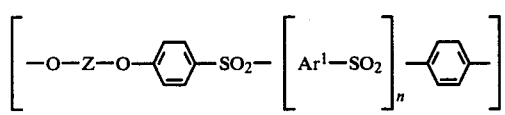 (IV)

wherein
Ar¹ has the above-mentioned meaning,
n is 0 or 1, and

Z corresponds to a p-phenylene radical or m-phenylene radical or a divalent radical of the following formula (V)

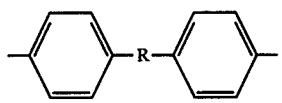 (V)

wherein
R has the above-mentioned meaning.

The branched aromatic polyether-sulphones also contain, in amounts between about 0.01 mol % and 2 mol %, tris-hydroxylate radicals or hydroxylate radicals with more than three hydroxylate groups, resulting from the incorporation of the branching components, and/or aryl branching radicals which are trivalent or more than trivalent, resulting from the halogenoaryl compounds which have three or more than three aryl-bonded halogen substituents which can be replaced under the reaction conditions of the polyaryl-ether-sulphone preparation.

Preferred hydroxylate branching radicals and aryl branching radicals which may be mentioned are the following radicals which are trivalent or more than trivalent and are derived from the branching components mentioned by way of example on Pages 5–7:

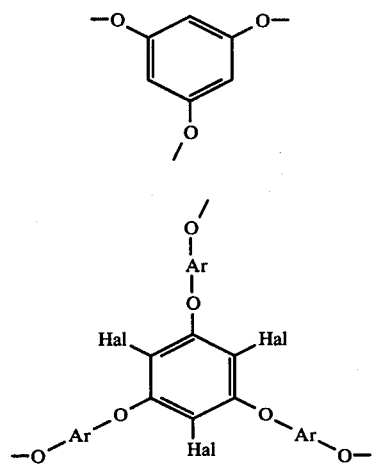

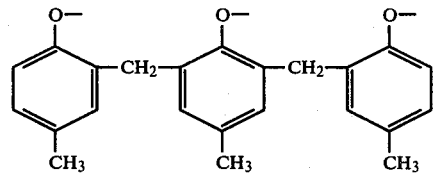

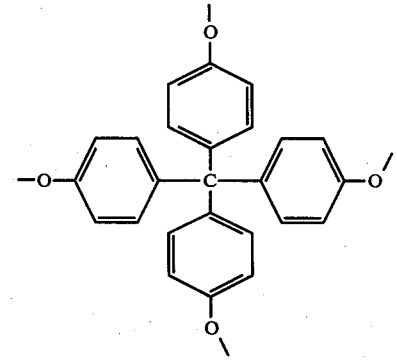

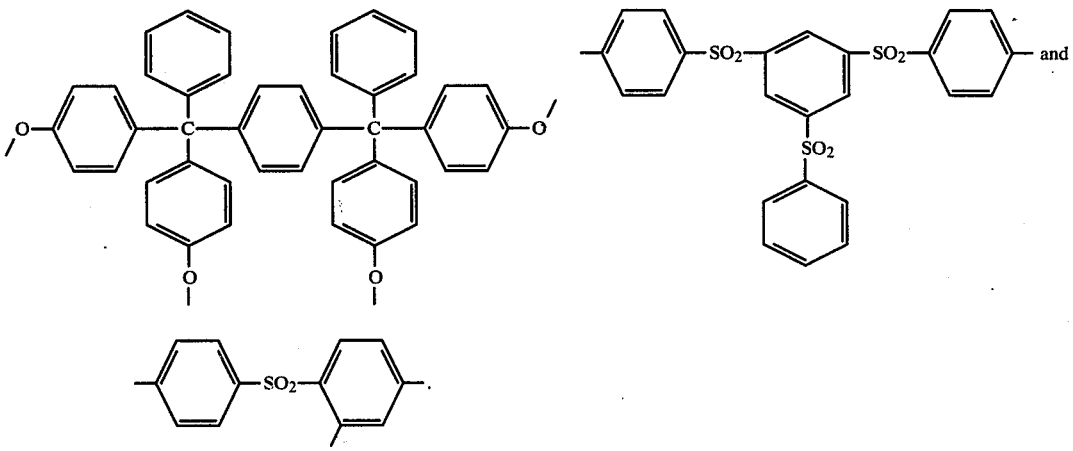

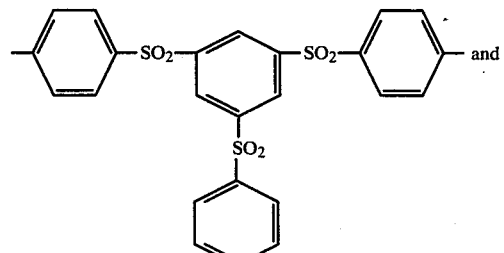

The definition of the symbols Hal and Ar in one of these formulae corresponds to that for formula III on page 6 of this application.

Polycarbonates which are suitable according to the invention are the aromatic homopolycarbonates and aromatic co-polycarbonates which are based, for example, on one or more of the following diphenols: hydroquinone, resorcinol, dihydroxydiphenyls, bis-(hydroxyphenyl)-alkanes, bis-(hydroxyphenyl)-cycloalkanes, bis-(hydroxyphenyl)sulphides, bis-(hydroxyphenyl)ethers, bis-(hydroxyphenyl)ketones, bis-(hydroxyphenyl)sulphoxides, bis-(hydroxyphenyl)-sulphones and α,α'-bis-(hydroxyphenyl)-diisopropylbenzenes, and their nuclear-alkylated and nuclear-halogenated compounds.

These and further suitable diphenols are described, for example, in U.S. Pat. Nos. 3,028,365, 2,999,835, 3,148,172, 3,271,368, 2,991,273, 3,271,367, 3,280,078, 3,014,891 and 2,999,846, all incorporated herein by reference, in German Offenlegungsschriften (German Published Specifications) Nos. 1,570,703, 2,063,050, 2,063,052, 2,211,956 and 2,211,957; French Patent Specification 1,561,518 and in the monograph "H. Schnell, Chemistry and Physics of Polycarbonates, Interscience Publishers, New York, 1964".

The aromatic polycarbonates can be prepared by known processes, thus, for example, from bisphenol and diphenyl carbonate by the melt trans-esterification process and from bisphenols and phosgene by the two-phase boundary process, as is described in the above-mentioned literature.

The aromatic polycarbonates can be branched by incorporating small amounts, preferably amounts between about 0.05 and 2.0 mol % (relative to diphenols employed), of compounds which are trifunctional or more than trifunctional, in particular those with three or more than three phenolic hydroxyl groups.

Polycarbonates of this type are described, for example, in German Offenlegungsschriften (German Published Specifications) Nos. 1,570,533, 1,595,762, 2,116,974, 2,113,347 and 2,500,092, British Patent Specification No. 1,079,821 and U.S. Pat. No. 3,544,514, incorporated herein by reference.

The weight-average molecular weights of the polycarbonates which are suitable according to the invention should be over about 60,000, preferably between about 65,000 and 120,000 and in particular between about 75,000 and 95,000. (Determined from the intrinsic viscosity, measured in $CH_2Cl_2$ solution).

Aromatic polycarbonates in the sense of the invention are, preferably, homopolycarbonates of bis-2-(4-hydroxyphenyl)-propane (bisphenol A) and copolycarbonates of at least about 30 mol %, preferably at least about 60 mol % and especially at least about 80 mol %, of bisphenol A and up to about 70 mol %, preferably up to about 40 mol % and especially up to about 20 mol %, of other diphenols. (The molar percentages in each case relate to the total molar amount of co-condensed diphenols).

Other diphenols which are suitable are bis-(hydroxyaryl)-$C_1$–$C_8$-alkanes other than bisphenol A, and bis-(hydroxyaryl)-$C_5$–$C_6$-cycloalkanes, in particular bis-(4-hydroxyphenyl)-$C_1$–$C_8$-alkanes and bis-(4-hydroxyphenyl)-$C_5$–$C_6$-cycloalkanes.

Examples of other diphenols which are suitable are bis-(4-hydroxyphenyl)-methane (bisphenol F), 2,4-bis-(4-hydroxyphenyl)-butane, 1,1-bis-(4-hydroxyphenyl)-cyclohexane, 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, 2,4-bis-(3,5-dimethyl-4-hydroxyphenyl)-2-methylbutane and 1,1-bis-(3,5-dimethyl-4-hydroxyphenyl)-cyclohexane.

Copolycarbonates which are preferred according to the invention contain bisphenol A and 1,1-bis-(4-hydroxyphenyl)-cyclohexane (bisphenol Z).

The polyaryl-sulphone/polycarbonate mixtures according to the invention can be prepared by the following four processes:

1. By melting the polycarbonate and the polyaryl-sulphone together, the melt being simultaneously or subsequently intimately mixed, and then extruding the homogenized melt in a suitable apparatus.

2. By melting the polyaryl-sulphone in a suitable apparatus and metering the polycarbonate into the melt of the polyaryl-sulphone, homogenizing the melt and then extruding the mixture in a suitable apparatus.

3. By mixing the solutions of the polycarbonate and of the polyaryl-sulphone, evaporating off the solvent, the mixture being melted, and simultaneously extruding the melt.

4. By admixing a solution of the polycarbonate to the melt of the polyaryl-sulphone, evaporating off the solvent, the polycarbonate being melted, homogenizing the melt and then extruding the mixture in a suitable apparatus.

Processes 2 to 4 are preferred mixing processes, and mixing process 4 is particularly preferred.

Mills, kneaders and screw extruders are to be understood as suitable apparatuses for the preparation of the mixtures according to the invention. Preferred apparatuses are screw extruders, in particular twin-screw extruders.

The extruded films can be produced from the mixtures according to the invention in a known manner, for example on standard three-zone, single-flight screws according to the state of the art, it being possible for the shaping into films to be carried out either via sheet dies to give subject films or via film blow-heads to give blown films.

The extruded films according to the invention have a particularly advantageous pattern of properties, which makes them suitable, for example, for use in the electrical sector.

The extruded films according to the invention have, inter alia, a high mechanical strength, a high resistance to stress-cracking under the influence of heat and in the presence of organic liquids, a high heat distortion point and stability to prolonged heat exposure. They are particularly distinguished by their resistance to unsaturated polyester resin solutions.

The additives and fillers which are known in polycarbonate chemistry and polysulphone chemistry can also be added to the mixtures according to the invention.

In this connection there may be mentioned, for example, dyestuffs, pigments, mold-release agents, stabilizers against the action of moisture, heat and UV light, lubricants and fillers, such as glass powders, quartz products, graphite, molybdenum sulphide, metal powders, powders of higher-melting plastics, for example polytetrafluoroethylene powder, natural fibers, such as cotton, sisal and asbestos, and furthermore glass fibers of the most diverse nature, metal filaments and fibers which are stable during the residence in the polycarbonate melt and do not noticeably damage the polycarbonates.

EXAMPLES

EXAMPLE 1:

80% by weight of a branched polyaryl-sulphone which has been prepared by reacting 0.25 mol of 2,2-bis-(4-hydroxyphenyl)-propane with 0.0025 mol of 2,6-bis-(2'-hydroxy-5'-methylbenzyl)-4-methyl-phenol and 0.25375 mol of 4,4'-dichlorodiphenyl-sulphone (see U.S. Pat. No. 3,960,815, Example 1) and has a $\overline{M}w$ of 30,000, and 20% by weight of a polycarbonate which is based on bisphenol A and has a $\overline{M}w$ of 95,000 are melted together in a twin-screw extruder, the barrel temperatures being 340° C. The melt is extruded as a strand. The strand is cooled and granulated.

The resulting granules are melted on a single-screw extruder with a degassing zone and the melt is extruded via a sheet die and drawn off via a chill-roll unit to give films about 40 μm thick. The resulting properties are given in the table which follows.

EXAMPLE 2:

Films are produced according to Example 1, but using 70% by weight of a branched polyaryl-sulphone according to Example 1 and 30% by weight of a bisphenol A polycarbonate, the $\overline{M}w$ of which is 75,000. The properties of the resulting films are given in the table which follows.

EXAMPLE 3: (Comparison Example)

The polymers according to Example 1 were dissolved together in methylene chloride, the concentration of the polymer mixture in methylene chloride being 17% by weight. After filtering and degassing in a known manner, the solution was cast on drum casting machines to give films about 40 μm thick. The resulting film was after-dried at 120° C. in order to remove the residual content of solvent. The properties of the film are given in the table which follows.

EXAMPLE 4: (Comparison Example)

Granules are prepared, according to Example 1, from 80% by weight of a branched polysulphone according to Example 1 and 20% by weight of a bisphenol A polycarbonate, the $\overline{M}w$ of which is 30,000, and are processed on a single-screw extruder with a blow-head to give films about 60 μm thick.

The barrel temperatures were 280° C. in the intake zone and 310° C. in the following zones. The die temperature was also set at 310° C. The die gap was 0.8 mm. The tube was inflated in the ratio 1:4. The take-off rate of the film wind-up was adjusted so that the desired film thickness of 60 μm was obtained at the chosen screw speeds. The properties of the resulting film are given in the accompanying table.

to produce an inert gas atmosphere. 20.03 g (0.5+0.0075 mol) of sodium hydroxide are then added in the solid form or as a concentrated aqueous solution and, after the sodium hydroxide has dissolved, 150 ml of toluene are added dropwise. The reaction mixture thus obtained is heated to a temperature of 140°–150° C. for 6 hours, the water contained in the reaction mixture and formed during the phenolate formation being continuously distilled off into the water-collecting device as an azeotrope with the toluene and separating out in this device, while the toluene is refluxed again into the reaction mixture. When all the water has been removed from the reaction system, the water-collecting vessel is emptied, the toluene is distilled off and a solution of 72.882 g (0.25+0.00375 mol) of 4,4′-dichlorodiphenyl-sulphone in 100 ml of anhydrous dimethylsulphoxide is added at a temperature of 120°–140° C. The mixture is then heated gradually to a reaction temperature of 150° C., while stirring. The reaction mixture is left at this temperature for 6 hours, the sodium chloride which forms during the condensation reaction rapidly separating out. After the reaction has ended, the cooled polymer solution is introduced into water stirred at a high speed, the resulting polyaryl-ether-sulphone separating out in the solid form. It is filtered off, washed carefully and dried in vacuo. For purification, the resulting polysulphone is dissolved in methylene chloride, the solution is filtered and the filtrate is poured into an excess of methanol stirred at a high speed. The polysulphone thereby separates out in white flakes. It is filtered off and dried.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A polyaryl-sulphone polycarbonate mixture comprising 95% by weight to 30% by weight of a branched

TABLE

|  | Film According to Examples | | | | Films of | |
|---|---|---|---|---|---|---|
|  | 1 | 2 | 3 | 4 | 100% Polysulphone According to Example 1 | 100% Polycarbonate $\overline{M}w$ 30,000 |
| Tensile strength (DIN 53,455) (MPa) | 95 | 105 | 85 | 80 | 100 | 80 |
| Elongation at break (DIN 53,455) (%) | 110 | 110 | 90 | 100 | 100 | 120 |
| Elongation at break after storing in toluene/n-propanol 1:3 for 10 seconds (%) | 110 | 110 | 15 | 15 | 15 | 3 |
| Resistance to unsaturated polyester resins | Resistant | | Not Resistant | | Not Resistant | |
| Heat distortion point (VDE 0345 % 25) (°C.) | 192 | 193 | 185 | 178 | 194 | 155 |
| Stability to prolonged heat exposure (VDE 0304, part 2) (°C.) | 158 | 156 | 142 | 140 | 155 | 136 |

STARTING MATERIALS

Example of the preparation of a branched polysulphone with a trisphenol addition of 1 mol %

57.075 g (0.25 mol) of 2,2-bis-(4-hydroxyphenyl)-propane and 0.871 g (0.0025 mol) of 2,6-bis-(2′-hydroxy-5′-methylbenzyl)-4-methyl-phenol are weighed into a metal vessel and dissolved in 500 ml of dimethylsulphoxide. The vessel is provided with a gas inlet tube, a stirrer, a thermometer, a reflux condenser and a water-collecting device filled with toluene. A slow stream of nitrogen is then passed through the apparatus in order polyaryl-sulphone and of 5% by weight to 70% by weight of a polycarbonate with a $\overline{M}w$ (weight-average molecular weight) greater than about 60,000.

2. A mixture according to claim 1, in which the $\overline{M}w$ of the polycarbonate component is between about 65,000 and 120,000.

3. A mixture according to claim 2, in which the $\overline{M}w$ of the polycarbonate component is between about 75,000 and 95,000.

4. A mixture according to claims 1, 2 or 3 which comprises about 90% by weight to 60% by weight of a branched polyaryl-sulphone and about 10% by weight to 40% by weight of said polycarbonate.

5. A mixture according to claim 4 which comprises about 85% by weight to 70% by weight of a polyaryl-sulphone and between about 15% by weight and 30% by weight of said polycarbonate.

6. A process for forming a polyaryl-sulphone/polycarbonate film comprising extruding a mixture as claimed in claim 1, 2 or 3.

7. A polyaryl-sulphone/polycarbonate film when produced by the process of claim 6.

* * * * *